United States Patent [19]
Jackson et al.

[11] Patent Number: 4,568,563
[45] Date of Patent: Feb. 4, 1986

[54] OPTICAL FIBRE MANUFACTURE

[75] Inventors: Thomas M. Jackson, Bishops Stortford; Rudolf A. H. Heinecke; Sureshchandra M. Ojha, both of Harlow, all of England

[73] Assignee: Standard Telephones and Cables, London

[21] Appl. No.: 747,389

[22] Filed: Jun. 21, 1985

Related U.S. Application Data

[63] Continuation of Ser. No. 635,812, Jul. 30, 1984, abandoned.

[30] Foreign Application Priority Data

Aug. 2, 1983 [GB] United Kingdom ............... 8320773

[51] Int. Cl.⁴ .............................................. B05D 3/06
[52] U.S. Cl. ................................... 427/40; 350/96.33; 350/96.34; 427/41; 427/163
[58] Field of Search ............... 427/38, 39, 40, 41, 427/163; 204/165; 350/96.29, 96.30, 96.31, 96.33, 96.34

[56] References Cited

U.S. PATENT DOCUMENTS

| B313,029 | 1/1975 | Lidel . | |
|---|---|---|---|
| 3,288,638 | 11/1966 | Van Paassen et al. | 427/40 |
| 3,471,316 | 10/1969 | Manuel | 427/41 |
| 3,677,799 | 7/1972 | Hou . | |
| 4,091,166 | 5/1978 | Kubacki | 427/41 |
| 4,227,907 | 10/1980 | Merritt | 427/163 |
| 4,396,641 | 8/1983 | Imada et al. | 427/40 |
| 4,402,993 | 9/1983 | Aisenberg et al. | 427/39 |
| 4,410,567 | 10/1983 | France et al. | 427/163 |

FOREIGN PATENT DOCUMENTS

| 2444926 | 4/1976 | Fed. Rep. of Germany | 427/41 |
|---|---|---|---|
| 2105371A | 3/1983 | United Kingdom | 427/39 |
| 2105729 | 3/1983 | United Kingdom . | |

OTHER PUBLICATIONS

Chemical Abstracts, vol. 90, No. 16, Apr. 1979, p. 24, No. 122383f, Stenyushin et al.
Chemical Abstracts, vol. 95, No. 8, Aug., 1981, p. 286, No. 66591m.

Primary Examiner—John H. Newsome
Attorney, Agent, or Firm—Dennis P. Clarke

[57] ABSTRACT

An optical fibre is provided with a moisture barrier layer by exposing a plastics coating on the fibre to a pulsed plasma in order to modify the surface, for instance by implantation of silicon and/or by the deposition on the plastics layer an inorganic layer such as a non-stoichiometric composition of silicon and carbon or silicon and nitrogen.

25 Claims, 1 Drawing Figure

U.S. Patent  Feb. 4, 1986  4,568,563
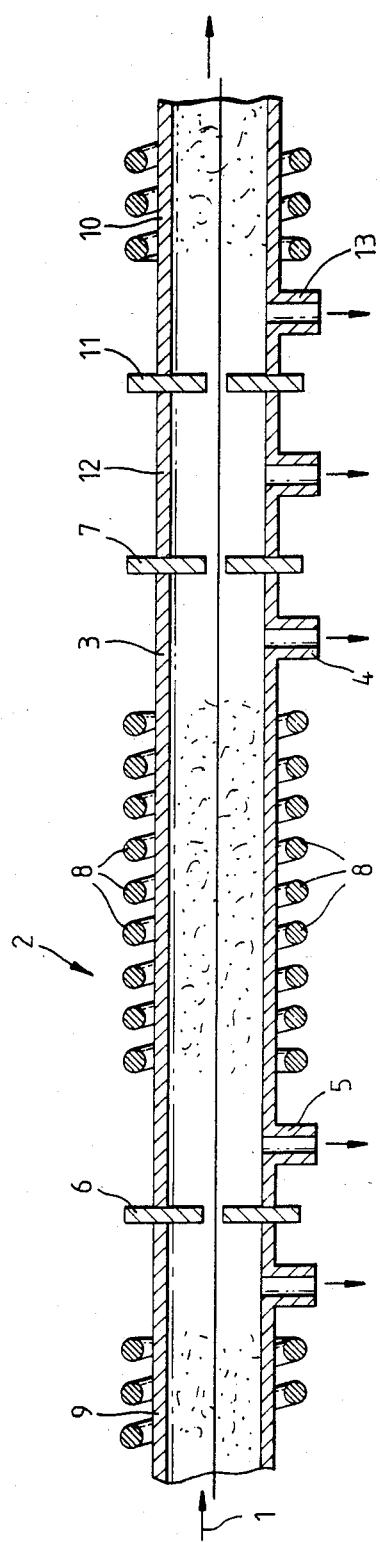

OPTICAL FIBRE MANUFACTURE

This is a continuation of application Ser. No. 635,812, filed July 30, 1984, now abandoned.

BACKGROUND OF THE INVENTION

This invention relates to the manufacture of glass optical fibres provided with coatings of relatively low water permeability.

One of the major problems in the long term mechanical durability of the glass optical fibres used in communication systems is the degradation with time of the high strength of the freshly drawn fibre. One of the principal causes of this degradation in strength is the result of stress corrosion, otherwise known as static fatigue, of the fibre. Minute cracks in the glass surface, which is typically of silica, are found to grow when the fibre is stressed in the presence of moisture. Water is found to play a part in the way in which such cracks progagate, and hence a reduction in the moisture level at the silica surface would prolong the life of the fibre.

Conventionally the pristine surface of freshly drawn optical fibre is protected by an on-line coating of plastics material. Typically this is a thin coating provided by solution coating, and is followed up by a secondary coating provided by extrusion. These coatings significantly reduce the rate at which the fibre strength is degraded by atmospheric attack, but there is considerable room for further improvement in view of the permeability to water of plastic layers deposited in this way.

Approaches have been made to provide improved resistance to water penetration by applying a metal coating to the glass prior to the application of any plastics coating. Such an approach has been reported for instance by D. A. Pinow et al in Applies Physics Letters, Volume 34(1) January 1979, pages 17 to 19, and by J. A. Wysocki et al in Advances in Ceramics, Volume 2 (Physics of Fibre Optics) B. Bendow, S. Mitron (Editors) ACS Inc. 1981 page 134. However, a drawback of this approach has been that in general any reduction in the rate of stress corrosion arising from improved hermeticity is accompanied by a reduction in the initial strength believed to be occasioned by damage done to the glass surface during the metal deposition.

An alternative approach is described in European Patent Application Specification No. 0034670 in which the glass optical fibre is provided with a primary plastics coating before the application of a metal coating on the plastics coating. This metal coating is applied from the melt, and hence considerable constraints are imposed upon the choice of compatible metals and plastics for this application.

SUMMARY OF THE INVENTION

An object of the present invention is to provide a low water permeability coating upon a glass optical fibre in a manner that does not on the one hand involve significant weakening of its strength, and on the other hand is not subject to all the materials limitations of coating with metal from the melt.

In pursuance of this object the present invention provides a method of providing a coating with low water permeability upon a glass optical fibre, which method includes the step of using a pulsed plasma to modify the surface of a plastics coating with which the optical fibre has been provided. This modification may take the form of changing the structure of the surface region of material already present, this may also involve removal of some of this material by etching, or the modification may involve adding fresh material to the existing material, or it may involve a combination of both of these techniques.

BRIEF DESCRIPTION OF THE DRAWING

Features of the invention will become more apparent having regard to the following description in which reference is made to the accompanying drawing which schematically depicts a part of the apparatus employed.

DETAILED DESCRIPTION OF THE PREFERRED EMBODIMENT

Conventionally plasma deposition, plasma etching and plasma treatment are carried out using a continuous discharge. This invention is however, concerned with the alternative plasma process in which the plasma is intermittently powered, using a small mark to space ratio, so that high peak powers can be produced with a low mean power dissipation as described in United Kingdom Patent Specification No. 2105729A. By this means it has been found possible to produce, without recourse to significantly elevated substrate temperatures, extremely high dissocation of gases down to atomic species, thereby making it possible to deposit dense and composite films of novel materials such as nitrides, carbides, borides, and oxides upon plastics materials either individually or in combination. Such films may typically be produced using a peak power density of at least several kilowatts per liter using pulses of between 1 millisecond and 1 microsecond duration and a mark to space ratio providing a mean power density of not more than a few tens of watts per liter. The avoidance of significantly elevated substrate temperatures also permits special effects to be produced using the pulsed plasma for surface treatment of the plastics substrate, for instance by modifying the surface, degassing it, producing surface melting to remove defects such as cracks and pores, promoting cross linking, or implanting material from the plasma into the surface. A plused plasma in an argon hydrogen mixture can be used to produce cross linking of high density polyethylene to a depth of 3 microns, whereas with a continuous discharge the depth of cross linking is typically limited to about 0.5 microns.

One of the features of using pulsed plasma for surface treatment of a plastics coating on an optical fibre, whether or not this surface treatment involves implantation, is that it produces a surface that is harder and denser, and thus more suited to forming a reliable bond with a subsequently deposited moisture barrier layer. Usually, but not necessarily, it is convenient for that layer to be deposited by a method involving the use of a pulsed plasma.

In instances where the pulsed plasma is being used for surface smoothing of an optical fibre plastics coating it is generally preferred not to use pure argon for the plasma but a mixture of argon and hydrogen because the hydrogen is found to accelerate the processing by tending to break up bonds in the polymer chains, whereas the argon tends to promote cross linking of the plastics surface. Hydrogen species may for the same reason also be effective in the atmosphere when the surface treatment involves implantation, thus for instance an atmosphere of argon containing some silane may be used for implanting silicon into the plastics surface. Alternatively, a silicon chloride can replace silane as the source of silicon. This siliciding of the surface may follow an initial surface treatment with pulsed plasma that does not involve any implantation. Yet another way of achieving the desired siliciding is to impregnate the plastics with a liquid compound of silicon, such as a siloxane or an organo-silane, such as trimethyl silane, and to use the pulsed plasma in argon or in an argon hydrogen mixture to cause the liquid to react chemically with the plastics material.

Reverting attention to the use of pulsed plasma for surface modification involving deposition, a preferred material is a generally non-stoichoimetric composition of silicon and carbon or of silicon and nitrogen. Preferably this deposition is upon an optical fibre plastics cladding whose surface has already been treated or siliciped by one of the pulse plasma techniques referred to previously. The atmosphere of the pulsed plasma is in this instance silane and acetylene for the 'silicon carbide' deposition or silane and nitrogen for the 'silicon nitride' deposition. Other materials that may be deposited in an analogous way include for example, alumina, titanium carbide and titanium nitride. Using a peak power density of only 12 kw per liter provides a deposition rate of about 0.1 microns per minute, and hence an adequate thickness of deposit in the region of 0.05 microns can be built up in about half a minute. By increasing the peak power density it should be possible to achieve a significant shortening of this deposition period. This is desirable because it makes it easier to perform the coating process on line with the drawing of the optical fibre from optical fibre preform.

Referring now to the accompanying drawing, an optical fibre 1 freshly drawn from preform and provided with a primary plastics coating on line with that drawing operation is drawn through a multisection processing chamber one of whose sections is indicated generally at 2. This section consists essentially of a tubular glass chamber 3 having one or more exit ports 4 connected to vacuum pumps (not shown) and one or more inlet ports 5 connected to a gas supply (not shown). The chamber terminates in baffle plates 6, 7 with orifices through which the plastics coated fibre 1 is able to pass freely, and is surrounded by a work coil 8 of a pulsed radio frequency power supply (not shown).

Only one part of the pulsed plasma processing is carried out in chamber 3; other parts are carried out in other chambers 9 and 10 upstream and downstream of chamber 3. In some circumstances the reactions in adjacent chambers may be such as to make direct connection possible, as illustrated by the connection between chambers 9 and 3; whereas in other circumstances a direct connection of this sort is undesirable. One reason may be that there is such a disparity in working pressure between the two chambers that there would be too much leakage of gas through the separating baffle from the higher pressure region into the lower pressure one. This problem may be overcome by an indirect connection such as that between chambers 3 and 10. In this instance leakage from one chamber to the other is prevented by the use of a pair of baffles 7 and 11 at either end of an intermediate section 12 which is evacuated by way of an outlet port 13.

In yet other circumstances leakage from one chamber into an adjacent chamber is no disadvantage, and indeed is welcomed because it helps achieve a smoother grading between the component parts of a moisture barrier layer.

A grading of the composition of the components of a moisture barrier layer is usually desirable because it generally provides better adhesion between the components than is presented by a relatively abrupt interface. Thus an initial pulsed plasma treatment to effect crosslinking of the plastics substrate material will in general produce a densification of the surface, making its properties closer to that of a subsequently applied layer deposited by pulsed plasma. Thus a better grading is achieved between the substrate and subsequently deposited material. It is then preferred gradually to change the deposition atmosphere encountered by the substrate so that the deposit gradually changes from an organic material to an inorganic material, such as aluminium or a carbide or nitride of silicon or titanium. Optionally the deposition may be continued further to grade back to a further organic layer which is hydrophobic. This may be for instance a fluorocarbon polymer layer. Apart from its reduced chemisorption of water, the presence of a fluorocarbon outer surface maybe advantageous in providing a low coefficient of friction for subsequent handling, for instance during cabling.

We claim:

1. A method of providing a coating with low water permeability upon a glass optical fibre, which method includes the step of using a pulsed plasma at reduced pressure and at a power level providing dissociation down to atomic species to modify the surface of a plastics coating with which the optical fibre has been provided.

2. A method as claimed in claim 1, wherein at least one aspect of the pulsed plasma induced modification takes the form of changing the structure of the surface region of material already present.

3. A method as claimed in claim 2, wherein the pulsed plasma induced modification also involves an etching away of some of the material already present.

4. A method as claimed in claim 1, wherein at least one aspect of the pulsed plasma induced modification takes the form of adding fresh material to the material already present.

5. A method as claimed in claim 1, wherein the pulsed plasma induced modification involves both the changing of the structure of the surface region of material already present and the adding of fresh material.

6. A method as claimed in claim 1, which method includes the step of using pulsed plasma in an atomosphere consisting of or including a mixture of argon and hydrogen to modify the surface of the plastics coating.

7. A method as claimed in claim 1, which method includes the step of using pulsed plasma to implant material into the surface of the plastics coating to chemically bond with the material of the plastics coating.

8. A method as claimed in claim 7, wherein said implanted material is silicon.

9. A method as claimed in claim 8, wherein the implantation of silicon is succeeded by the step of using pulsed plasma to coat the modified surface with an inorganic layer whose composition includes silicon.

10. A method as claimed in claim 9, wherein said inorganic layer is a generally non-stoichiometric composition of silicon and carbon.

11. A method as claimed in claim 9, wherein said inorganic layer is a generally non-stoichiometric composition of silicon and nitrogen.

12. A method as claimed in claim 1, which method includes the step of using pulsed plasma to cause liquid absorbed into the surface of the plastics coating to react chemically with the material of that coating.

13. A method as claimed in claim 12, wherein said chemical reaction is such as to cause silicon to be chemically bonded with the material of the plastics coating.

14. A method as claimed in claim 13, wherein the step of causing silicon to be chemically bonded with the material of plastics coating is succeeded by the step of using pulsed plasma to coat the modified surface with an inorganic layer whose composition includes silicon.

15. A method as claimed in claim 14, wherein the composition of the deposited layer is a generally non-stoichiometric composition of silicon and carbon.

16. A method as claimed in claim 14, wherein the composition of the deposited layer is a generally non-stoichiometric composition of silicon and nitrogen.

17. A method as claimed in claim 1, wherein pulsed plasma is used to modify the surface of the plastics coating by the promotion of crosslinking, wherein pulse plasma is used to deposit material matching the cross-linked material, whereby a grading is provided between the bulk material of the coating and the deposited material, and wherein the atmosphere to which the coating is exposed in the pulsed plasma is changed to grade the deposit from organic material to inorganic material.

18. A method as claimed in claim 17, wherein the inorganic material is a compound of silicon.

19. A method as claimed in claim 17, wherein the inorganic material is a compound of titanium.

20. A method as claimed in claim 17, wherein the inorganic material is a nitride.

21. A method as claimed in claim 17, wherein the inorganic material is a carbide.

22. A method as claimed in claim 17, wherein the inorganic material is alumina.

23. A method as claimed in claim 17, wherein the atmosphere is further changed to grade the deposit back from the inorganic layer to a further organic layer which further organic layer is a layer of hydrophobic material.

24. A method as claimed in claim 23, wherein the hydrophobic material is a fluorocarbon polymer.

25. A method as claimed in claim 1, wherein the coating is exposed to pulsed plasma in a cascaded arrangement of reaction chambers.

* * * * *